US006287450B1

(12) United States Patent
Hradil (10) Patent No.: US 6,287,450 B1
(45) Date of Patent: *Sep. 11, 2001

(54) APPARATUS AND METHOD FOR PURIFYING WATER WITH AN IMMERSED GALVANIC CELL

(76) Inventor: George Hradil, c/o Covofinish Company, 266 Davis Dr., Pascoag, RI (US) 02859

( * ) Notice: Subject to any disclaimer, the term of this patent is extended or adjusted under 35 U.S.C. 154(b) by 0 days.

(21) Appl. No.: 09/237,553

(22) Filed: Jan. 26, 1999

(51) Int. Cl.[7] .................................................. C02F 1/461
(52) U.S. Cl. ......................... 205/745; 204/242; 204/248
(58) Field of Search ........................... 205/745; 204/242, 204/248

(56) References Cited

U.S. PATENT DOCUMENTS 4,416,854 * 11/1983 Nielsen ................................ 205/745

FOREIGN PATENT DOCUMENTS

1440886 * 6/1976 (GB) ..................................... 205/745

* cited by examiner

Primary Examiner—Arun S. Phasge
(74) Attorney, Agent, or Firm—Fuess & Davidenas (57) ABSTRACT

A water purification system and method suitable for use in swimming pools, spas, hot tubs, water storage tanks, wells and water cooling towers employs a galvanic cell having a silver or copper or zinc anode electrically connected to a cathode made from a metal of still higher electrochemical potential, normally a platinum group metal and preferably palladium. A galvanic cell of some tens of square centimeters in size and some hundreds of grams in weight liberates sufficient silver or copper ions so as to treat a multi-thousand liter body of water, such as a swimming pool, for, typically under normal contamination, some months until the anode is consumed. Copper and/or silver ions liberated from the galvanic cell suppress bacterial, fungal and/or algae growth, thus, significantly reducing the amount of chlorine, bromine or other chemicals needed to maintain water quality. The invention operates on the current generated by the galvanic action between the dissimilar metals of the anode and cathode, and does not require external electrical power.

11 Claims, 7 Drawing Sheets

16  Top View

Cross-Section A

Top View

Cross-Section B

APPARATUS AND METHOD FOR PURIFYING WATER WITH AN IMMERSED GALVANIC CELL

REFERENCE TO RELATED PATENT APPLICATIONS

The present patent application is related to, and claims benefit of priority of, U.S. provisional patent application Serial No. 60/AAA,AAA filed on Jan. 26, 1998 to the selfsame inventor George Hradil of the present application.

BACKGROUND OF THE INVENTION

1. Field of the Invention

The present invention generally concerns water purification systems.

The present invention particularly concerns the purification of water in swimming pools, spas, hot tubs, water storage tanks, wells and water cooling towers by use of galvanic cells in order to inhibit the growth of bacteria, fungus and algae while significantly reducing the amount of chemicals (chlorine, bromine, hypochlorite, persulfate, ozone, etc.) necessary to maintain water quality.

2. Description of the Previous Art

2.1. Water Purification

The paramount function of water treatment is to destroy harmful microorganisms. This is usually accomplished by adding oxidizing agents such as chlorine, iodine and oxygen. In swimming pools and spas, the treatment of water to eliminate microorganism contamination ordinarily incorporates chemical treatment in combination with a mechanical filtering usually accomplished by drawing water from the pool with a pump, forcing it through a filter and returning it to the pool. Because the mere addition of a quantity of a chemical in liquid or soluble form permits the circulation system to effectuate quick dispersal, sanitization treatment is an easy task. Chlorine is typically used as a sanitation agent. However, chlorine is malodorous, rather inefficient, unhealthful, and not particularly economical.

At ordinary temperatures, chlorine is a gas, difficult to handle, and is not generally available. Accordingly, chlorine used in pools and ponds is combined with some compound that dissociates upon addition to pool water. Chlorine is popularly introduced as a constituent of calcium hypochlorite, sodium hypochlorite, chlorinated isocyanurates, or some other acid, or as a salt. If added as a salt, additional chemicals are required to avoid harmful accumulations of any other constituents of the salt, resulting in the problematic requirement of maintaining a chemical balance.

The process of purification of pool water using electrolysis has already been developed, and is well known in the art. Shindell, in U.S. Pat. No. 4,328,084 (1982) describes a water purification system employing salt in quantities sufficient to make the water slightly conductive and circulating that water through the electric field between a pair of dissimilar metal plates in order to dissociate salt ions from the water. The dissociated ions of salt and water are converted to oxidizing agents capable of destroying organic matter, which is converted to substances that can be removed by mechanical filtration. The process reportedly results in economical and effective purification. However, a major problem arises when a purification cell is placed in the circulation piping. The pump must operate continuously to maintain an effective level of chlorine or oligodynamic ions. This is not a problem in large commercial pools, however, in residential pools, the cost of continued operation becomes prohibitive. Also, governmental restrictions apply and costs of installation are high.

Metallic ions are known to kill or control algae and bacteria. It is well established that silver and copper ions are effective bactericides and algaecides. Treatment with silver has been used by NASA to purify water on the Apollo space missions. The practice of using silver and copper vessels to improve water quality dates back to ancient times. Ancient Phoenicians stored wine in silver urns to preserve it, providing one the earliest recorded examples of use of this metal for that purpose. Zinc, aluminum, and gold ions are just a few additional metals that can be used similarly.

Dahlegren, U.S. Pat. No. 4337136, (1982), purifies pool water by using a pair of silver-copper alloy electrodes extending from a floating container. Electrical energy is provided by a battery, using a timer switch that reverses the current as required to reduce erosion of the electrodes. The operating life of such a cell is limited by the requirement of batteries.

Sherman, in U.S. Pat. No. 5,085,753, describes a water purifier with a buoyant housing for supporting a purification cell below the water's surface and for supporting a solar cell array for providing power for the purification cell. The cell operation includes electrolytic processes, electrocution and oxidation to destroy bacteria and algae.

There are two types of undesirable elements in pool water: 1) impurities in suspension, in the form of precipitates or colloids, and 2) dissolved, extremely small, electrically charged impurities in the ionic state. To eliminate these impurities, flocculation processes—consisting of introducing a reactant into the water to create colloids with adsorption properties—have been used. The colloids cause flocculation, which encloses the impurities in suspension. Large particles are formed and are separated from the water by filtering. To facilitate flocculation, the pH of the water has to be adjusted, in many cases, to below 7.4 or above 8.5.

2.2. Water Purification With Metal Ions

Conventional purification devices use either (i) an excess of anodic reaction products, (ii) a particular linear relationship between purification cell current and treated water temperature, (iii) addition of sodium persulfate to water in which copper and silver ions have been added from copper-silver electrodes immersed in the water, or (iv) addition of salt in sufficient quantities to make the water slightly conductive followed by circulating the slightly conductive water through an electric field between a pair of electrode plates. These conventional devices and methods have generally been uneconomical and inefficient, and have focused on producing and regulating a DC current from an AC power source so as to maintain the safety of swimmers. The equipment is expensive, complicated and generally requires special installation and monitoring, thereby increasing manufacturing, operating and liability insurance costs.

Solar powered purification cells can overcome some of these problems, However, other drawbacks such as excessive gassing, corrosion, and accumulation of scale and deposits at the purification cell electrodes, result in reduced efficiency, destruction of the cell and/or the necessity of repetitively cleaning the electrodes.

In U.S. Pat. 5,279,748, issued to Hackett, water is passed through an "electrolytic filter" consisting of packed granules of copper and zinc, or "a copper-zinc filter media." "As water passes through the electrolytic granules, a chemical reaction causes metal hydroxides to form in controlled amounts. These controlled releases of oxides are carried into the filtered water where they kill bacteria and provide a hostile environment for algae and fungus growth." The amount of ionized metal entering the pool is controlled by varying the flow rate of water entering the electrolytic filter independent of the physical straining filter. The electrolytic filter is impervious to the bacterial growth to which similar filters (composed of other materials) can be susceptible. Hackett's device is claimed to eliminate the need for chlorine.

U.S. Pat. No. 4,492,618 to Eder discloses a method in which electrodes of a copper-silver alloy are dissolved in the treated water via the application of a periodically reversed direct current. The electrically induced dissolution of the electrodes liberates copper and silver ions into the water. Sodium persulfate is added to the water for the "oxidation of organic matter."

In U.S. Pat. No. 4,608,247 issued to Heinig, silver is deposited on a large surface area support and combined with carbon to produce a composition favorable to the dissolution of silver ions in water.

In U.S. Pat. No. 5,352,369, also issued to Heinig, a method is described in which silver deposited on a large surface area alumina matrix acts as a catalyst "in the presence of oxygen to form an active oxidizer in the water." This active oxidizer is claimed to be effective in the containment of bacterial and algal growth.

LeMire, in U.S. Pat. No. 4,935,116, describes a device consisting of concentric cylinders of dissimilar metals (copper and silver) that are electrically connected, with provisions to pass water to be treated in the annulus of said cylinders. The dissimilar metals form a voltaic cell whereby the metals are eroded to supply copper and silver ions to the water.

2.3. Silver Water Purification

Silver-based water purification systems offer the most reliable and cost-effective alternatives to chlorine, a chemical that is increasingly coming under fire for the carcinogenic byproducts it leaves in water. Because of increasing pollution, utilities are forced to put far more chlorine into the supply chain. Recently, chlorine has been shown to produce by-products linked to cancer in laboratory animals, prompting an immediate US government review. These same byproducts have been generated by chlorination for a long time, but never in the quantities that are now being seen.

In Britain, silver ionization is being developed for mainstream water systems. Capitalizing on silver's long-known biocidal properties and safety factors, the Institute of Water Ionization Technologies, UK, has developed silver ion generators for municipal water supplies. A recent project to study the control of Legionnaires disease by using silver ions was funded by the UK Department of the Environment. The disease is named after Legionella pneurnophilia, an organism that is widespread in small quantities within natural water sources. The bacteria is lethal at a water temperature of 95° F., but can be killed at temperatures between 135 and 140° F. Of the methods tested, silver/copper ions in soft water were found to be most effective. The copper ion disrupted the enzyme structures of the cell, allowing the silver ion to penetrate inside, where it rapidly inhibited the cell's life support system.

U.S. regulations allow a silver level of 100 ppb in drinking water, but a silver level of only 20 ppb kills Legionella. A proposed European Union Drinking Water Standard has removed any upper limit for silver in drinking water, following the World Health Organization's Guidelines for Drinking Wafer Quality, which determined that it is unnecessary to recommend any health-based guidelines for silver, as it is not hazardous to human health. Silver ion generators are currently being used in intensive care and heart transplant units of hospitals, and for poultry processing, engineering, brewing, cooling towers and swimming pools.

According to the most recent research on the swimming pool industry, published in 1993 by the National Spa and Pool Institute, 6.6 million individuals in the United States own pools, 3.4 million of which are in-ground and 3.2 million are aboveground. NSPI estimates that approximately 160,000 in-ground pools are built annually in the United States, in addition to about 475,000 aboveground pools. Silver-based mechanisms for keeping swimming pools sanitized are gaining widespread popularity among pool owners preoccupied with the mounting health hazards of chlorine.

Silver-copper ion systems have sanitized tens of thousands of swimming pools worldwide for several decades, inactivating organisms including *Bacillus typhosus, Legionella pneumophila* and *E. coli*. Copper ions in the system have eliminated unwanted algae growth in pools, and have supplemented silver in controlling other pathogens, such as the polio virus. The technology works by producing positively charged ions that attack and destroy the negatively charged cells of organisms like bacteria and algae. The positively charged ions also work by interfering with the metabolism of organisms like bacteria and algae.

The purification method named the number one alternative to chlorine, based on research conducted by Swimming Pool and Spa Age magazine, is a silver catalyst system that has the capacity to instantly destroy bacteria and viruses. The system deposits silver microcrystals on the inside of a flow-through cartridge, which feeds oxygen into the water flow. The oxidized silver destroys bacteria, viruses and organic matter. Tests performed by the U.S. Environmental Protection Agency (EPA) at the University of Arizona, for example, found that the cartridge reduced the presence of E. coli in water by 99.96 percent within five seconds.

The use of silver in swimming pool sanitation is growing because of the many other advantages these systems offer. Silver systems are less expensive operationally than chlorine and other chemical systems. Also, silver does not evaporate from the water leaving the pool unprotected and does not stain the skin or bleach clothing.

2.4 Galvanic Cells

It is known, by practitioners in the art, that each metal has its own electrochemical potential. Additionally, it is known that when two dissimilar metals, each with different electrochemical potentials are immersed in a conductive solution and electrically connected together, a galvanic cell or battery will be formed; such that current will flow from the metal of lower electrochemical (anode) potential to the metal of high chemical potential (cathode). Moreover, it is known that the metal of lower electrochemical potential will be dissolved into the electrolyte at a rate proportional to the current flowing between the two electrodes. This process transpires when a strip of a metal such as silver is immersed in water containing ionic species. A strip of another metal, such as platinum, is immersed in the water and is electrically connected to the silver strip, commonly by wire via an ampere meter. Current flows from the silver strip through the wire and ampere meter to the platinum strip due to the potential difference between the two metals. At the surface of the silver strip metallic silver atoms lose electrons to form silver ions. The electrons liberated by the oxidation of metallic silver flow through the electrical connection between the two metals, comprising a current which can be detected by the ampere meter. At the surface of the platinum, electrons typically react with oxidizing species, such as hypochlorite ions.

A galvanic cell is a simple and effective means of introducing small quantities of beneficial metal ions into water. What has been misunderstood by previous investigators (LeMire and Hackett) is that the metal of higher electrochemical potential is cathodically protected by the flow of current in the galvanic cell and is therefore inhibited from dissolving. In fact, this effect is exploited in galvanized steel and in other applications such as the use of a sacrificial zinc electrode for underground tank and marine applications. Therefore, the devices described by LeMire and Hackett will only be effective in dissolving the metal of lower chemical potential. Silver, which has a relatively high electrochemical potential, will not be appreciably dissolved.

SUMMARY OF THE INVENTION

The present invention contemplates immersing and operating a two-metal twoelectrode galvanic cell in water rendered electrically conductive by the presence of ions of, for example, chlorine where the anode of the galvanic cell (i) is the metal with the higher electrochemical potential, and work function, and (ii) is sacrificial, liberating metal ions of a type suitable for water purification. The anode metal is typically silver, copper or zinc, and the cathode metal a platinum group metal, preferably palladium. The metal ions liberated from the galvanic cell serve to inhibit the growth of bacteria, fungi and algae.

Accordingly, one object of the present invention is an improved water purification system that is capable of removing water-borne micro-organisms from pools, spas, hot tubs, lakes, ponds, and marshes without the need to add additional chemical disinfectants to chemically balance the water.

Another object of the present invention is a water purification device that substantially eliminates complicated circuits, hardware, and other unnecessary equipment.

Still another object is to provide considerable energy savings over in-line chlorinators, particularly during times of low or no water contamination.

Yet another object of the invention is scalability in water purification, permitting usage of fewer purification cells in small reservoirs and more purification cells in larger reservoirs.

In order to accomplish the aforementioned and other objects, the self-contained, inexpensive water purification device of the present invention is generally suitable for use in all reservoirs of water that have been rendered electrically conductive by the presence of ions. The galvanic action between dissimilar metals (typically silver, copper or zinc and a platinum group metal, such as palladium) immersed in the electrically conducting solution is used, as in the prior art, to liberate metal ions. The metal ions may even be, and most commonly are, the selfsame silver, copper or zinc ions long recognized to be safe and effective for purifying water.

However, unlike the prior art, the liberated metal comes from the anode, and not the cathode, of the galvanic cell. If the galvanic cell is to function as such, and without any external source of electrical potential, this means that the metal or other material of the cathode must have a greater electrochemical potential, or work function, than does the anode metal. If the anode metal is zinc, which has a relatively low electrochemical potential, or copper, which has a higher electrochemical potential, then this requirement may be met by several metals that may be located in any chemistry handbook. However, if the anode metal is to be silver which has a very high electrochemical potential, then this is a demanding requirement. Of common elements, only gold, palladium and platinum have a higher electrochemical potential than does silver.

The precise mechanism of the biocide effect is not known with respect to this invention. Experiments have shown that the amount of silver liberated to the solution is minuscule, and yet, pool trials have found a significant beneficial effect. It is believed that the effect is due to surface-adsorbed silver complexes, rather than dissolved silver in the pool water. Calculations have indicated that only 0.1 to 0.05 grams of silver are required to form an adsorbed monolayer in a typical pool. The occurrence of temporary photosensitive discoloration of the pool or spa surface further evidences the likelihood of surface adsorption of silver.

Accordingly, in accordance with the present invention a water purification device is realized as a galvanic cell consisting of two metals: 1) a first metal drawn from the group consisting essentially of silver, copper and zinc, in electrical contact with 2) a second metal having a higher electrochemical potential than does the first metal. The second metal is most commonly a member of the platinum group, or gold. The device is immersed in the electrically conductive water. An effective amount of the first metal is liberated into the water by galvanic action so as to serve to inhibit the growth of bacteria, fuingi and algae.

In its preferred embodiment, the water purification device is compactly packaged as, preferably, two metal mesh grids, screens, strips or shot, or any combination thereof, that are overlaid permanently one upon the other, or otherwise positioned in physical and electrical contact. The two mesh grids—one of which is made of one metal as the anode and the other of which is made of another metal as the cathode of a galvanic cell—are thus in physical and electrical contact with each other over a substantial area. Nonetheless to this substantial area of contact, voids in the mesh grids permit the ready circulation of water and of the ions contained within the water. The device is generally used in water rendered electrically conductive by the presence of chlorine ions, particularly in mass bathing basins including swimming pools, spas, and hot tubs.

The water purification device of the present invention is preferably used in a mass bathing basin that has a recirculation system, and is located in line with the flow of the recirculation system. The flow makes that the electrodes of the device are continually exposed to new conductive ions in the water, and that the zinc, copper or silver ions liberated from the anode are promptly transmitted away and dispersed into the body of water.

In the case of a mass bathing basin having a chlorination point within the recirculation system, the device is preferably located directly downstream from the chlorination point within the recirculation system. This location makes that the electrodes of the device are not only continually exposed to conductive chlorine ions in the water, but are exposed to these ions at the location of their highest density.

In a most preferred embodiment, a water purification device for use in a swimming pool having a chlorination point within a recirculation system is contemplated. The device employs a first grid made of a first metal from the group consisting of zinc, silver and copper in electrical contact with a second grid made of a second metal having a higher electrochemical potential than does the first metal. A mechanism for retaining both grids together as a galvanic cell is also contemplated. The galvanic cell device is immersed in flowing water in a position directly downstream from the chlorination point within the swimming pool's recirculation system. Therein, by galvanic action, a sufficient amount of the first metal is liberated into water of the swimming pool so as to serve as inhibitor of the growth of bacteria, fungi and algae.

The present invention is also embodied in a method of generating aqueous metal ions, by action of which ions water is purified. The method includes immersing, within water rendered electrically conductive by the presence of ions, a galvanic cell consisting essentially of a first metal, drawn from the group of zinc, silver and copper, that is in electrical contact with a second metal having a higher electrochemical potential than does the first metal. An effective amount of the first metal is liberated into the water by galvanic action as first metal ions so as to serve as inhibitor of the growth of bacteria, fungi and algae.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 4:
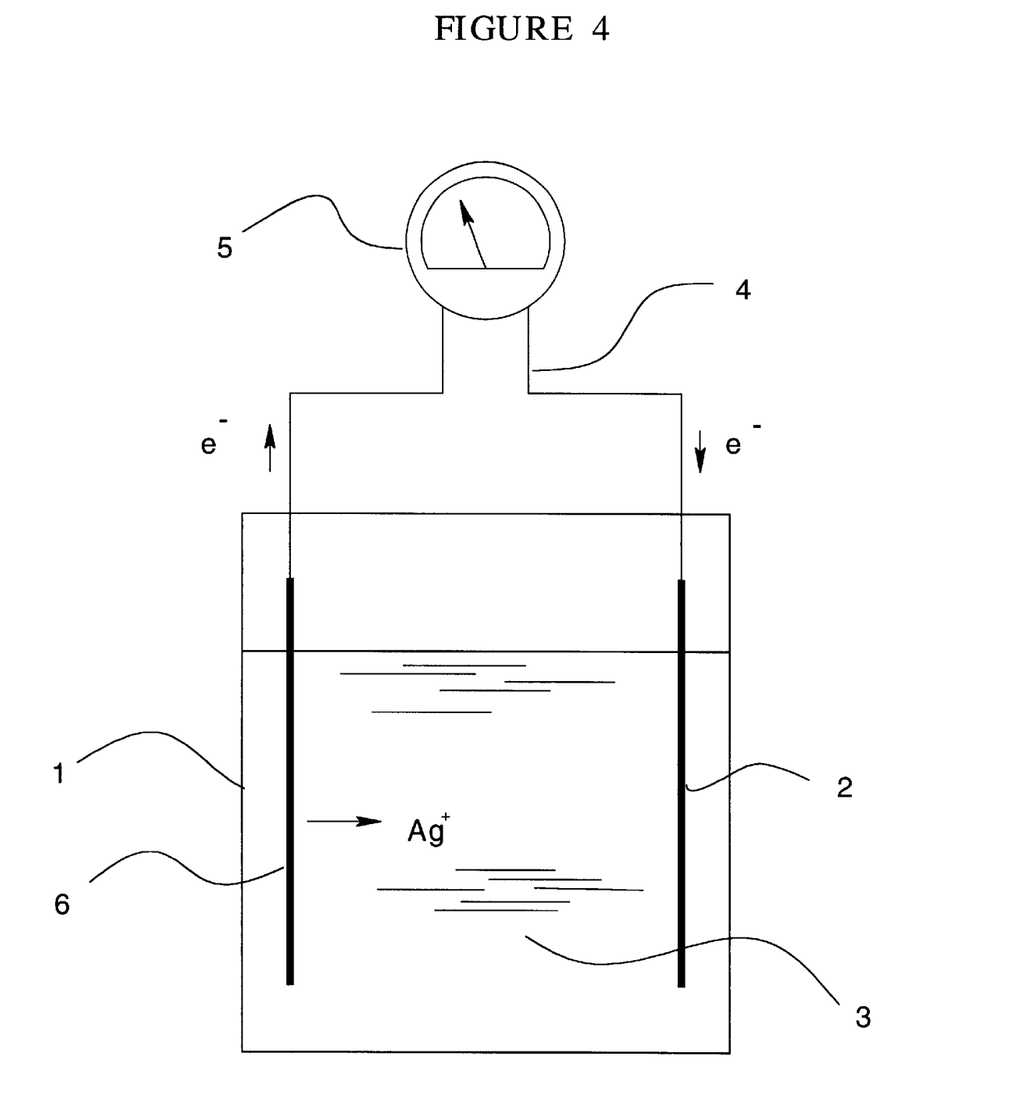
FIG. 4 is a schematic diagram of a common galvanic cell having silver and platinum electrodes.

The process of monitoring galvanic action is illustrated in FIG. 4 where a strip of, by way of example, silver metal (6) is immersed in water containing ionic species (3). A strip of, by way of example, platinum metal is immersed in said water (3) and is electrically connected to the silver strip (6) via an ampere meter (5) and associated wire (4). Current flows from the silver strip (6) through the ampere meter (5) to the platinum strip due to the potential difference between the two metals. At the surface of the silver strip (6) metallic silver atoms lose electrons to form silver ions. The electrons liberated by the oxidation of metallic silver flow through the electrical connection between the two metals, comprising a current which can be detected by the ampere meter (5). At the surface of the platinum, electrons typically react with oxidizing species, such as hypochlorite ions.

In a preferred embodiment of the present invention, dissimilar metals (typically zinc, copper or sliver in combination with a platinum group metal or gold) are maintained in electrical contact with each other and retained in a container. The container is immersed within a reservoir of water—which water has already been rendered electrically conductive by the presence of ions—that is to be treated. The metals may consist of metal foil, expanded mesh, shot, wire, metal wool, or any other form of metal presenting a large surface area. The dissimilar metals are in electrical contact, thereby, forming a galvanic cell which dissolves over time the metal of lower electrochemical potential (typically zinc, copper or silver), consuming over time the anode of the galvanic cell, which is sacrificed. The cathode metal (typically relatively inert gold or a platinum group metal, such as palladium) neither dissolves nor dissipates.

The container may simply be placed below the skimmer basket of the swimming pool or spa, or may be placed anywhere in the body of water to be treated. Alternately, the dissimilar metals in electrical contact with one another may be placed in a chamber through which the water to be treated is circulated by means of a pump. Typically, the device will be a mixed packing of silver metal and a platinum group metal (e.g., palladium). An additional mixed packing of copper and a platinum group metal may be employed to provide copper ions to the water. Furthermore, a mixed packing of copper, silver and a platinum group metal may also be used.

It has also been found that the rate of metal dissolution is greater as the concentration of hypochlorite ions or other oxidizers in the water is increased. It is therefore desirable to situate the packing of dissimilar metals at the point of chlorination or where other oxidizing agents are added to the pool. This may be accomplished by incorporating the dissimilar metals into a chlorine dispenser, thereby exposing the mixed metal packing to the water at point of its highest ionic strength. This device would then provide both chlorine and metal ions to the water to be treated. Alternatively, this can be accomplished by locating the metallic packing in a chamber in-line with the pool or spa recirculation system directly downstream of the chlorination point.

In any case, the metal dissolution rate is increased if the metal packing is exposed to water having higher concentrations of oxidizing ions. It has also been demonstrated that the dissolution rate is dependent on the velocity of the treated water with respect to the metal surface; therefore, it is desirable to enhance the liquid contacting of the device to the water to be treated. It is possible to enhance both the liquid contacting and the concentration of oxidizing ions by combining the galvanic cell with a chlorine dispenser which is recirculating a stream of the water to be treated.

One possible implementation of the invention is a perforated container which incorporates a chamber where a mixed packing of silver and platinum are retained and which further features a chamber where calcium hypochlorite powder or tablets could be held. This container could be placed in or below the skimmer basket or in the inlet strainer of the filtration pump. In this way, both high oxidizer concentration as well as excellent liquid contacting can be maintained.

EXAMPLE ONE

Figure 1:
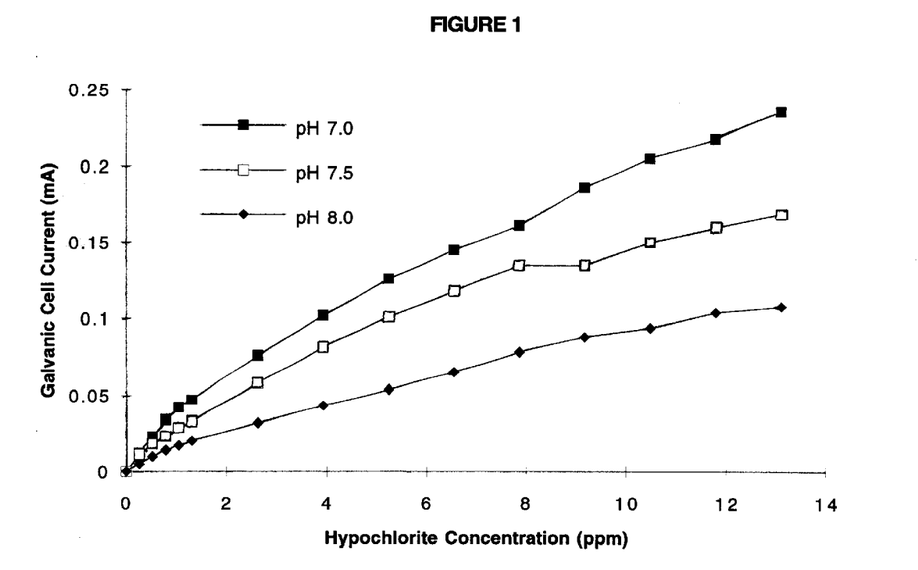
FIG. 1 is a plot of the current between silver and platinum as a function of hypochlorite concentration.

A strip of 2.5 cm by 5.0 cm silver metal foil and a 2.5 cm by 5.0 cm strip of platinized niobium expanded mesh were immersed in 200 mls of DI water. The silver and platinum strips were separated by 0.5 mm thick polypropylene mesh and are electrically connected via a volt/ampere meter. The solution was agitated with a magnetic stirrer while a dilute solution of sodium hypochlorite was titrated into the DI water. The potential (voltage) and the current between the metals was recorded as a function of sodium hypochlorite concentration. The results for pH 7.0, 7.5, and 8.0 are shown in FIG. 1.

EXAMPLE TWO

Figure 2:
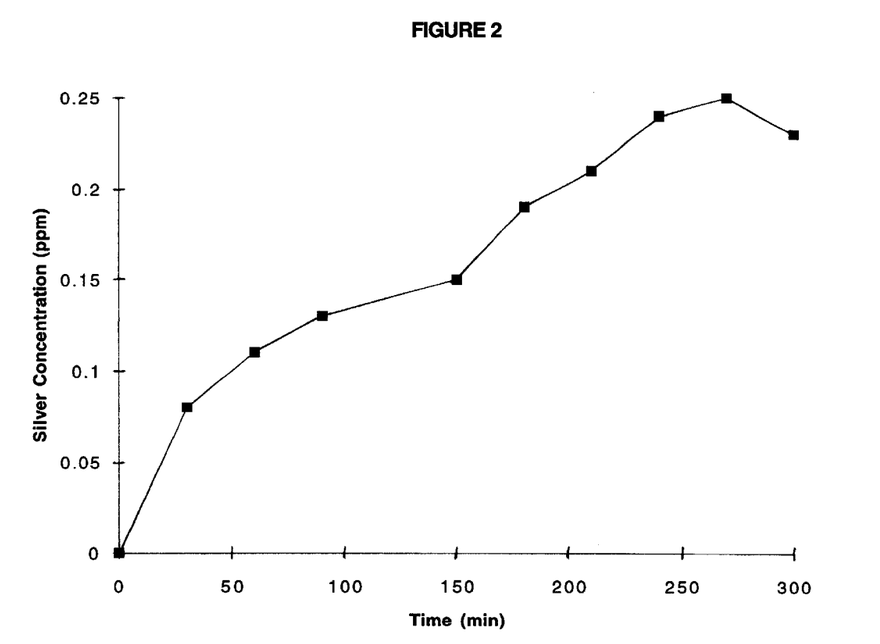
FIG. 2 is a plot of the silver concentration as a function of time during the galvanic cell reaction between platinum and silver.

A strip of 2.5 cm by 5.0 cm silver metal and a 2.5 cm by 5.0 cm strip of platinized niobium expanded mesh was immersed in 200 mls of DI water containing 5.25 ppm of sodium hypochlorite. The solution pH is 7.5. The silver and platinum strips were separated by 0.5 mm thick polypropylene mesh and were electrically connected via a volt/ampere meter. The solution was agitated with a magnetic stirrer. The potential was 0.47 V and the current was 0.066 mA. The solution was analyzed for silver every 30 minutes using an Atomic Absorption spectrometer. The results are shown in FIG. 2. The measured silver dissolution rate is 5% to 15% of the theoretical amount calculated from the measured current.

EXAMPLE THREE

Figure 3:
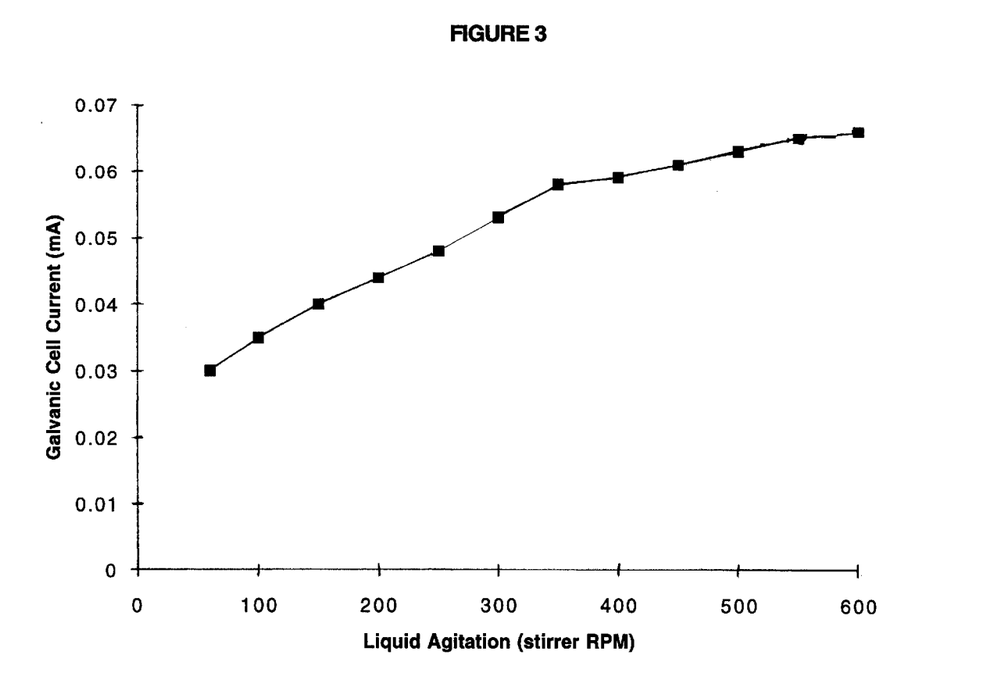
FIG. 3 is a plot of the current between silver and platinum as a function of liquid agitation.

A strip of 2.5 cm by 5.0 cm silver metal and a 2.5 cm by 5.0 cm strip of platinized niobium expanded mesh were immersed in 200 mls of DI water containing 5.25 ppm of sodium hypochlorite. The solution pH was 7.5. The silver and platinum strips were separated by 0.5 mm thick polypropylene mesh and were electrically connected via a volt/ampere meter. The solution was agitated with a magnetic stirrer. The stir bar rotation rate was varied and the corresponding current was recorded to determine the dependence of silver dissolution on the liquid shear rate. The results are shown in FIG. 3.

Figure 5A:
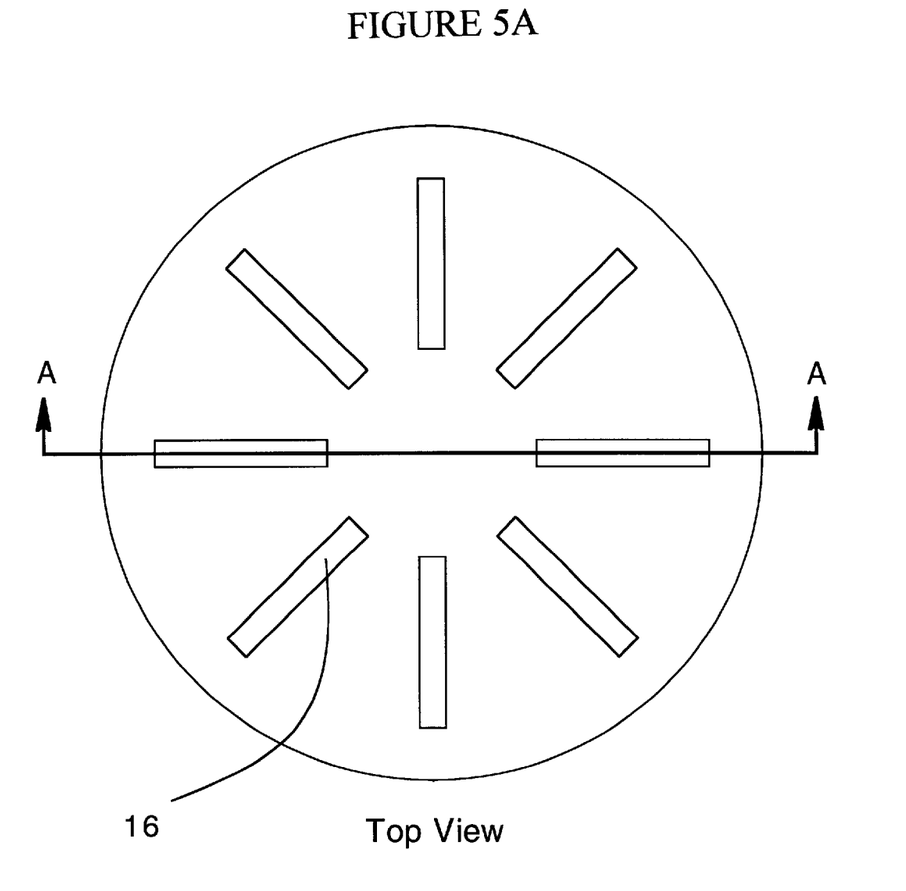
FIG. 5A is a top view of an embodiment of the current invention.
Figure 5B:
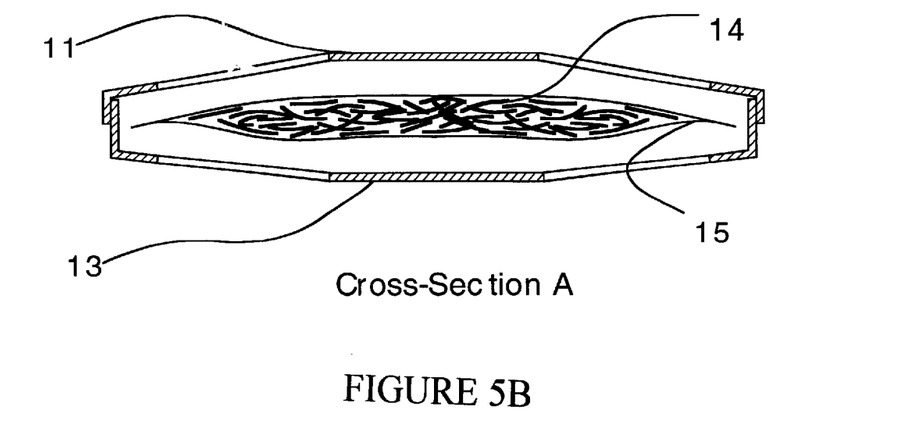
FIG. 5B is a cross-sectional view of FIG. 5A taken at aspect line A—A.

Now, turning in greater detail to the two embodiments of the invention depicted in the appended drawings, FIGS. 5a and 5b show one possible implementation of the current invention. A mixed packing of strips of platinized foil and silver foil (14) is retained in a polyethylene or nylon mesh pouch (15). The plastic pouch is contained in a hard case with top and bottom sections (11) and (13) respectively. Both the top (11) and bottom (13) sections have slots (16) to allow liquid flow through the case (FIG. 5a). The device may be placed below the skimmer basket of the pool or in the inlet strainer of the filter pump.

Figure 6A:
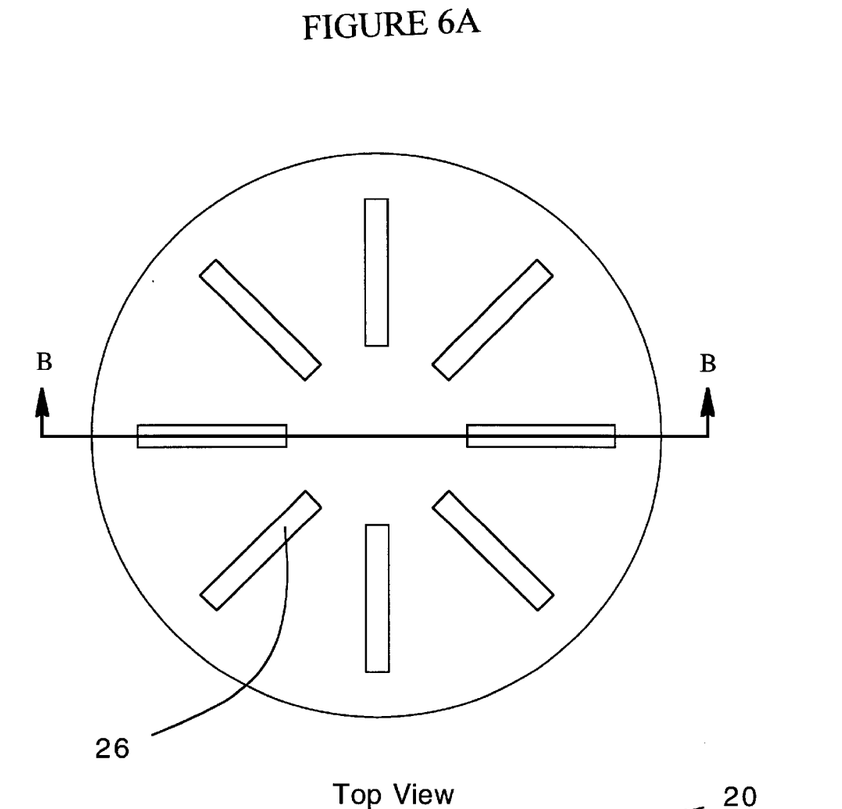
FIG. 6A is a top view of another embodiment of the invention incorporating a chlorine dispenser.
Figure 6B:
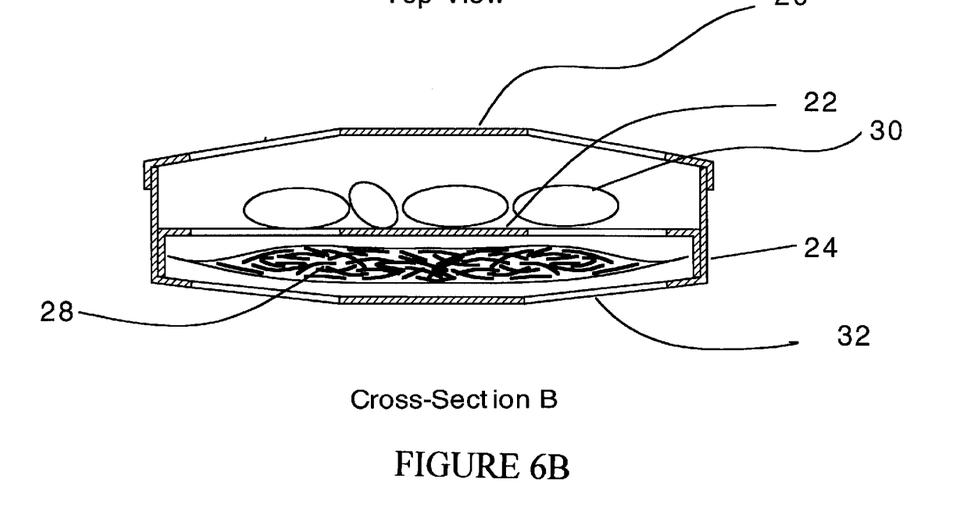
FIG. 6B is a cross-sectional view of FIG. 6A taken at Aspect line B—B.

FIGS. 6a and 6b illustrate an embodiment of the current invention in which the galvanic cell is incorporated into a chlorine dispenser. The outer casing consists of two sections (20) and (24). A mixture of platinized (a coating 10–100 millionths of an inch thick plated, clad or electroplated on niobium or stainless steel) and silver foil strips (14) is encapsulated by a polyethylene or nylon mesh pouch (15). The most preferred metal for the platinized coating is palladium. The mesh pouch (15) is separated from the hypochlorite tablets (30) by a divider (22). The outer casing and the divider have slots (26) which allow the water to circulate through the enclosure. The top section of the device (20) is removable to allow the user to replenish the hypochlorite tablets (30). The device may be placed in the skimmer basket of the pool or in the inlet strainer of the filter pump, or alternatively may simply be placed anywhere below the water surface.

Figure 7A:
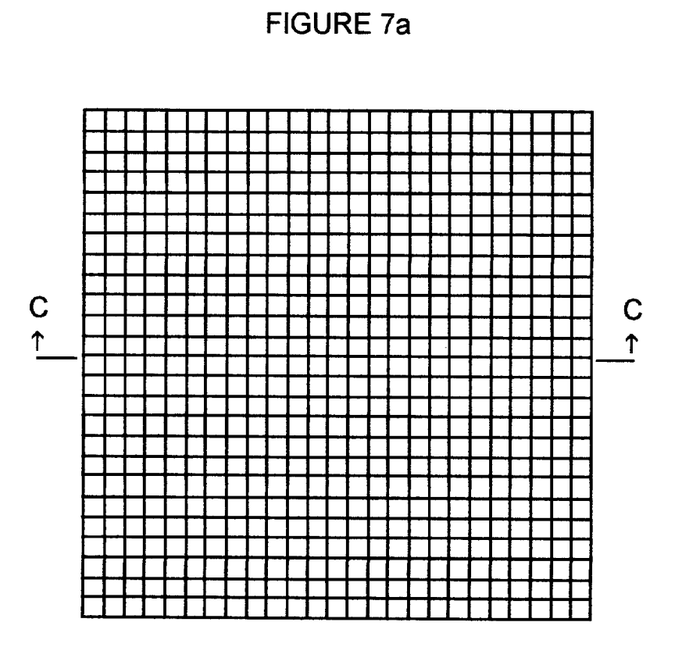
FIG. 7A is a top view of another preferred embodiment of the invention.
Figure 7B:
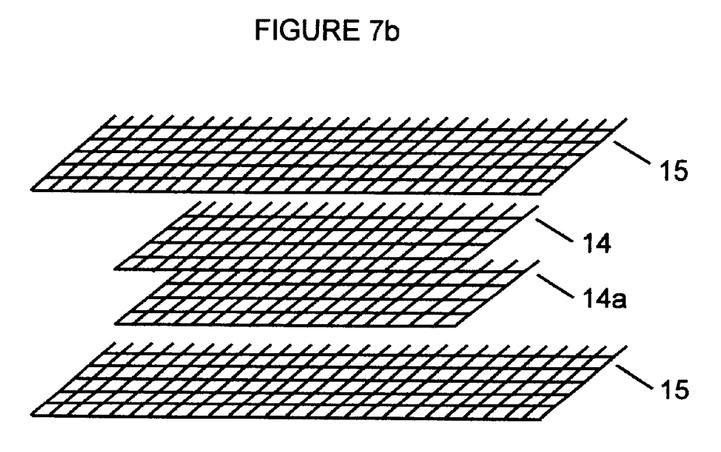
FIG. 7B is a cross-sectional view of FIG. 7A taken at aspect line C—C.

FIG. 7a depicts a top view of a most preferred embodiment of a package of the galvanic cell in accordance with the present invention. FIG. 7b is a cross-sectional view of FIG. 7a, taken at aspect line C—C, depicting the layers of an anodic metal (14) juxtapositioned to a cathodic metal (14a) sandwiched between two polyethylene or nylon layers forming a pouch. The package may be either square or circular in shape.

Basic start-up instructions for the use of the galvanic sanitizer that is the present invention are as follows:
  Clean the debris and algae from the pool and equipment,
  Balance the pool water as normal,
  Add one unit (packet) of this invention to the skimmer for every 25,000 gallons of pool water,
  Start with new packets only once at the beginning of each season,
  After approximately 14 days, begin to cut back on chlorine usage.

In accordance with the preceding explanation, variations and adaptations of the water purification device in accordance with the present invention will suggest themselves to a practitioner of the water sanitization arts.

In accordance with these and other possible variations and adaptations of the present invention, the scope of the invention should be determined in accordance with the following claims, only, and not solely in accordance with that embodiment within which the invention has been taught.

What is claimed is:

1. A water purification device for use in water rendered electrically conductive by the presence of ions but with so few ions as to permit acidity to remain within a range suitable for a swimming pool, the device comprising:
  a galvanic cell consisting essentially of
  a first metal drawn from the group of silver and copper and zinc, in physical and electrical contact with
  a second metal having a higher electrochemical potential than does the first metal,
  where at least one of the first metal and the second metal is in the form of a planar mesh while the other metal is also in a planar form laid flat against the mesh, immersed in the water rendered electrically conductive by the presence of ions;
  wherein openings within the at least one mesh permit circulation of the water so that the ions within the water may readily come into contact with both the first and the second metals where there is little distance between them;
  wherein by galvanic action an effective amount of the first metal is liberated into the water so as to serve as to inhibit the growth of bacteria, fungi and algae.

2. The water purification device according to claim 1 wherein the galvanic cell's second metal consists essentially of a metal of the platinum group.

3. The water purification device according to claim 2 wherein the galvanic cell's second metal of the platinum group consists essentially of palladium.

4. The water purification device according to claim 1 in use in chlorinated water rendered electrically conductive by the presence of chlorine ions.

5. The water purification device according to claim 4 in use in a mass bathing basin including swimming pools, spas, and hot tubs.

6. The water purification device according to claim 5 in use in a mass bathing basin having a recirculation system, the device being located in line with a flow of water containing ions through the recirculation system;

wherein flow of the water containing ions through the at least one mesh, and into regions between the first and the second metals, is promoted by flow in the recirculation system.

7. The water purification device according to claim 5 in use in a mass bathing basin having a chlorination point within the recirculation system, the device being located directly downstream from the chlorination point within the recirculation systems;

wherein concentration of ions in the water is relatively high at locations of the first metal and the second metal, promoting galvanic action between the first metal and the second metal.

8. The water purification device according to claim 1 where the both the first metal and the second metal are in the form of a planar mesh.

9. A water purification device for use in a swimming pool having a chlorination point within a recirculation system, the device comprising:

a first grid made of a first metal from the group consisting of silver and copper and zinc; in electrical contact with a second grid made of a second metal having a higher electrochemical potential than does the first metal; and means for retaining both grids closely physically proximate and electrically connecting as a galvanic cell immersed in flowing water in a position directly downstream from the chlorination point within the swimming pool's recirculation system;

wherein by galvanic action a sufficient amount of the first metal is liberated into water of the swimming pool so as to serve as to inhibit the growth of bacteria, fungi and algae so that use of chlorine in the swimming pool is reduced;

meanwhile that, because of both (i) location and (ii) geometry of the grids, (a) chlorine ions as are within the swimming pool water may freely contact both (b) the first metal and the second metal which are in electrical contact, permitting galvanic action to transpire nonetheless that concentration of chlorine should be low.

10. (Amended) A method of generating aqueous metal ions by action of which water is purified, the method comprising:

immersing a galvanic cell consisting essentially of
a first metal drawn from the group of silver and copper and zinc, in electrical and physical contact with
a second metal having a higher electrochemical potential than does the first metal,
where at least one of the first metal and the second metal is in the form of a planar mesh while the other metal is also in a planar form laid flat against the mesh, within flowing water rendered electrically conductive by the presence of a low concentration of ions;

wherein by galvanic action transpiring where the first metal contacts the second metal in presence of occasional ions as do come into contact from the water flowing through the at least one mesh, an effective amount of the first metal is liberated into the water as first metal ions so as to serve as to inhibit the growth of bacteria, fungi and algae nonetheless that the concentration of ions is low.

11. A water purification device for use in water rendered electrically conductive by the presence of a low concentration of ions, the device comprising:

a galvanic cell consisting essentially of
a first mesh of a first metal drawn from the group of silver and copper and zinc, in physical and electrical contact with
a second mesh of a second metal drawn from the platinum group, and thus having a higher electrochemical potential than the first metal, immersed in the water rendered electrically conductive by the presence of the low concentration of ions;

wherein by galvanic action transpiring where the first metal contacts the second metal in presence of occasional ions as do come into contact from the water flowing through both the first and the second meshes, an effective amount of the first metal is liberated into the water so as to serve as to inhibit the growth of bacteria, fungi and algae nonetheless that the concentration of ions is low.

* * * * *